US011522880B2

(12) United States Patent
Vajipayajula et al.

(10) Patent No.: US 11,522,880 B2
(45) Date of Patent: Dec. 6, 2022

(54) ANALYTICS ENGINE FOR DATA EXPLORATION AND ANALYTICS

(71) Applicant: International Business Machines Corporation, Armonk, NY (US)

(72) Inventors: Sulakshan Vajipayajula, Bangalore (IN); Paul Coccoli, Marietta, GA (US); James Brent Peterson, Atlanta, GA (US); Michael Vu Le, Danbury, CT (US); Ian Michael Molloy, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 16/924,659

(22) Filed: Jul. 9, 2020

(65) Prior Publication Data
US 2022/0014531 A1   Jan. 13, 2022

(51) Int. Cl.
*H04L 9/40*      (2022.01)
*G06N 20/00*   (2019.01)

(52) U.S. Cl.
CPC ......... *H04L 63/1416* (2013.01); *G06N 20/00* (2019.01); *H04L 63/1433* (2013.01); *H04L 63/1441* (2013.01)

(58) Field of Classification Search
CPC ............. H04L 63/1416; H04L 63/1433; H04L 63/1441; G06N 20/00
See application file for complete search history.

(56) References Cited

U.S. PATENT DOCUMENTS

| 9,258,321 | B2 | 2/2016 | Amsler et al. |
| 9,306,965 | B1 | 4/2016 | Grossman et al. |
| 10,320,813 | B1 | 6/2019 | Ahmed et al. |
| 10,362,057 | B1 | 7/2019 | Wu |
| 11,263,229 | B1* | 3/2022 | Basavaiah ........... G06F 16/2477 |
| 11,269,876 | B1* | 3/2022 | Basavaiah ................. G06F 8/77 |
| 11,303,503 | B1* | 4/2022 | Fletcher .............. G06F 11/3476 |
| 11,362,910 | B2* | 6/2022 | Lin ......................... H04L 41/28 |
| 2012/0131339 | A1* | 5/2012 | Mangalore ............ H04L 9/3213 713/168 |
| 2016/0103702 | A1* | 4/2016 | Schneider ............... G06F 16/25 718/101 |

(Continued)

FOREIGN PATENT DOCUMENTS

EP   3528463 A1   8/2019

OTHER PUBLICATIONS

Alina Oprea et al., MADE: Security Analytics for Enterprise Threat Detection, ACSAC '18, Dec. 3-7, 2018.

(Continued)

*Primary Examiner* — Joseph P Hirl
*Assistant Examiner* — Stephen T Gundry
(74) *Attorney, Agent, or Firm* — Terrile, Cannatti & Chambers, LLP; Emmanuel A. Rivera

(57) ABSTRACT

A method, system, and computer-usable medium for analyzing security data formatted in STIX™ format. Data related to actions performed by one or more users is captured. Individual tasks, such as analytics or extract, transform, load (ETL) tasks related to the captured data is created. Individual tasks are registered to a workflow for executing particular security threat or incident analysis. The workflow is executed and visualized to perform the security threat or incident analysis.

20 Claims, 9 Drawing Sheets

(56) References Cited

U.S. PATENT DOCUMENTS

| | | | |
|---|---|---|---|
| 2017/0228658 A1 | 8/2017 | Lim | |
| 2018/0288063 A1* | 10/2018 | Koottayi | H04L 63/1416 |
| 2020/0004751 A1* | 1/2020 | Stennett | G06F 16/24568 |
| 2020/0028862 A1* | 1/2020 | Lin | H04L 63/1441 |
| 2021/0216572 A1* | 7/2021 | Braghin | G06F 16/215 |
| 2021/0216983 A1* | 7/2021 | Glickman | H04L 63/0414 |
| 2021/0224834 A1* | 7/2021 | Buesser | G06N 5/04 |
| 2021/0258349 A1* | 8/2021 | Crabtree | G06F 16/951 |
| 2021/0281583 A1* | 9/2021 | Okunlola | G06F 40/30 |
| 2021/0311996 A1* | 10/2021 | Bonin | G06F 16/9035 |
| 2021/0344747 A1* | 11/2021 | Chu | H04L 41/5096 |
| 2021/0374558 A1* | 12/2021 | Tommasi | G06F 8/36 |
| 2021/0392156 A1* | 12/2021 | Singh | H04L 41/0253 |
| 2022/0006837 A1* | 1/2022 | Crabtree | G06F 16/2477 |
| 2022/0014561 A1* | 1/2022 | Caceres | H04L 63/1425 |
| 2022/0019674 A1* | 1/2022 | Frey | H04L 63/20 |
| 2022/0027431 A1* | 1/2022 | Zheng | H04L 67/125 |
| 2022/0030009 A1* | 1/2022 | Hasan | H04L 63/1491 |
| 2022/0060510 A1* | 2/2022 | Clayton | H04L 63/1408 |
| 2022/0060512 A1* | 2/2022 | Crabtree | H04L 63/1425 |
| 2022/0078210 A1* | 3/2022 | Crabtree | G06F 16/9024 |
| 2022/0114262 A1* | 4/2022 | Bhatia | G06F 21/577 |
| 2022/0116761 A1* | 4/2022 | Dames | H04W 4/90 |
| 2022/0174097 A1* | 6/2022 | Biswas | H04L 43/0817 |

OTHER PUBLICATIONS

Rob High, "The Era of Cognitive Systems: An Inside Look at IBM Watson and How it Works," IBM Redbooks, 2012.

Michael Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

ANALYTICS ENGINE FOR DATA EXPLORATION AND ANALYTICS

BACKGROUND

The present disclosure relates in general to the field of computers and similar technologies, and in particular to software utilized in this field. Still more particularly, it relates to a method, system, and computer-usable medium for an optimized platform and framework to analyze captured data.

Various entities, such as private businesses and companies, government institutions, universities, research institutions, military facilities, etc. have secure information technology (IT) infrastructures. Such IT infrastructures support multiple users who regularly access resources outside of or external to the IT infrastructures. For example, users may perform searches and download data from external websites and sources outside of an IT infrastructure and control of IT administrators.

Because externally downloaded data may be outside the IT infrastructure and control of IT administrators, there can be a concern as to the security of the data. Security information and event management (SIEM) is a field of computer security, where software products and services combine security information management (SIM) and security event management (SEM). Real-time analysis of security alerts can be generated by applications and network hardware. Downloaded data may present a security threat or incident to the entity. In certain cases, downloaded data may not in of themselves be a threat, but in a particular sequence or workflow, downloaded data as tasks in a workflow may present a security threat or incident.

In other instances, an entity may desire to analyze downloaded data to determine particular workflows that may not necessarily present security threats or incidents. For example, a workflow may be directed to observed user patterns.

To properly investigate security threats or incidents, security analysts and administrators may need data science experience and resources to properly assess downloaded data and the context of downloaded data in particular workflows. Tasks in a workflow are based on the downloaded data and may run a particular platform. Analysts and administrators may have to determine and run such tasks on specific platforms in the workflow.

SUMMARY

A method, system, and computer-usable medium are disclosed for analyzing security data formatted in a Structured Threat Information eXpression (STIX)™ (a trademarked product of OASIS Cyber Threat Intelligence TC, for automated information sharing for cybersecurity) format. Data related to actions performed by one or more users is captured. Individual tasks, such as analytics or extract, transform, load (ETL) tasks related to the captured data is created. Individual task is registered to a workflow for executing a particular security threat or incident analysis. The workflow is executed and visualized to perform a security threat or incident analysis.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

The present application generally relates to data analysis and providing a platform to run workflows to analyze data. Described herein is a software as a service or SaaS that supports running and synchronization of heterogeneous (i.e., different platforms) data exploration (e.g., security data) related analytic jobs in a workflow. In certain implementations, analytic jobs are shared between a cloud implemented system and an edge device (e.g., a system that is near a data capture system). Downloaded data, such as Structured Threat Information Expression (STIX™) formatted data, can be converted to be used for Machine Learning (ML) or Artificial Intelligence (AI). Jobs or tasks are created by ML/AI components for the downloaded and converted data. In certain implementations, analysis on the workflow of tasks is provided as service to support interactive analytics on the downloaded data as a "data frame as a service."

Figure 1:
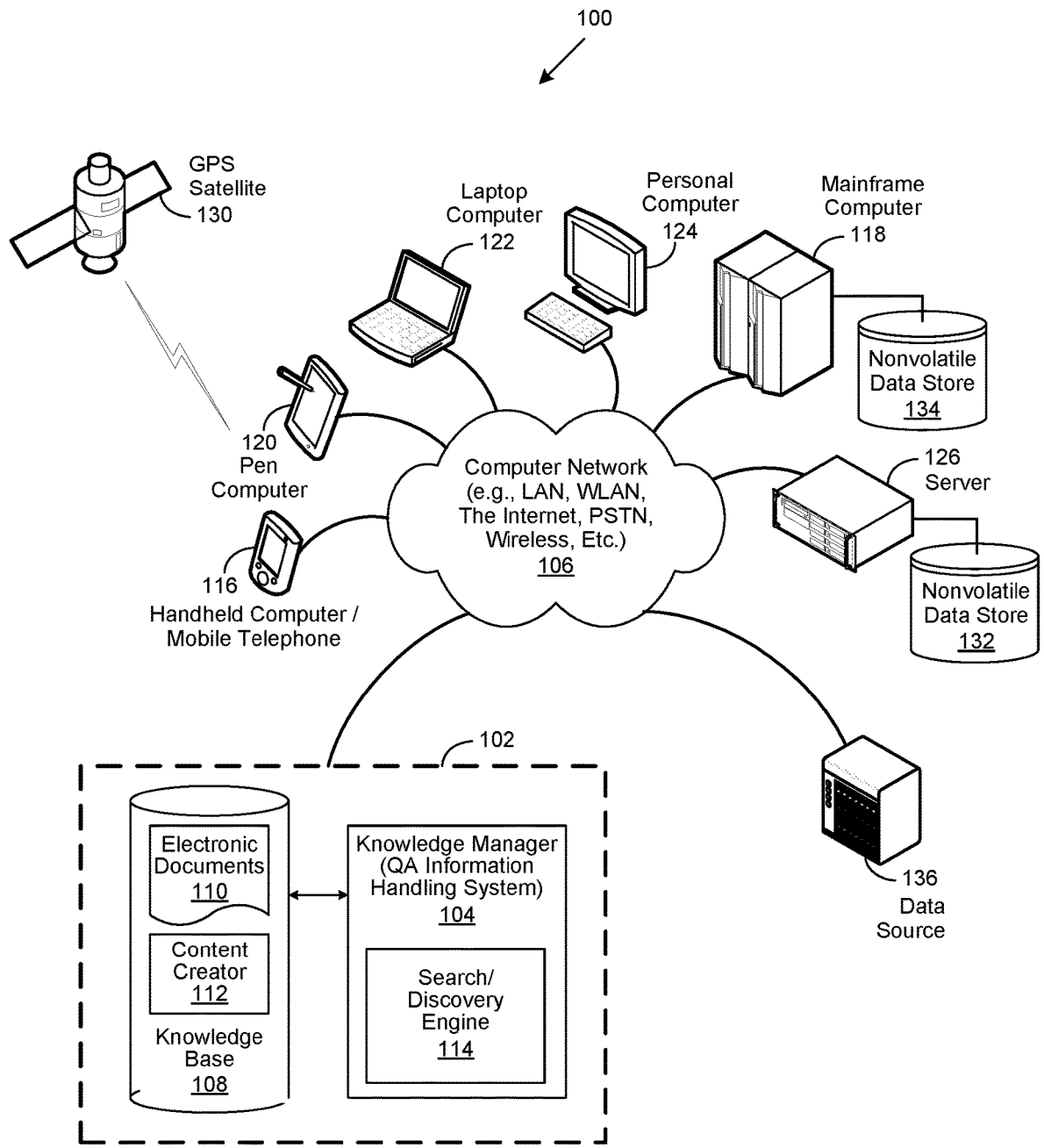
FIG. 1 depicts a computer network environment that includes a knowledge management system.

FIG. 1 depicts a schematic diagram of one illustrative embodiment of a computer network environment that supports the systems and methods described herein. In particular, the computer network environment 100 provides for a knowledge management system 102 which is instantiated in computer network environment 100.

The knowledge management system 102 may include a knowledge manager (question and answering information handling system) computing device 104 that includes one or more processors and one or more memories, and potentially any other computing device elements generally known in the art including buses, storage devices, communication interfaces, and the like) connected to a network 106. The network 106 may include multiple computing devices in communication with each other and with other devices or components via one or more wired and/or wireless data communication links, where each communication link may comprise one or more of wires, routers, switches, transmitters, receivers, or the like.

The knowledge management system 102 and the computer network environment 100 may enable question and answer (QA) generation functionality for one or more content users. Other embodiments of knowledge management system 102 may be used with components, systems, subsystems, and/or devices other than those that are depicted herein.

Knowledge manager computing device 104 may be configured to receive inputs from various sources. For example, knowledge manager computing device 104 may receive input from the network 106, a knowledge base 108 which can include a corpus of electronic documents 110 or other data, a content creator 112, content users, and other possible sources of input. In various embodiments, the other possible sources of input can include location information. In one embodiment, some or all of the inputs to knowledge manager computing device 104 may be routed through the network 106. The various computing devices on the network 106 may include access points for content creators and content users. Some of the computing devices may include devices for a database storing the corpus of data. The network 106 may include local network connections and remote connections in various embodiments, such that the knowledge management system 102 may operate in environments of any size, including local and global, e.g., the Internet. Additionally, knowledge manager computing device 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator 112 creates content in electronic documents 110 for use as part of a corpus of data with knowledge manager computing device 104. The electronic documents 108 may include any file, text, article, or source of data for use in knowledge management system 102. Content users may access knowledge management system 102 via a network connection or an Internet connection (represented as to the network 106) and may input questions to knowledge management system 102 that may be answered by the content in the corpus of data. As further described below, when a process can implement a query with exclusion criteria from the knowledge manager. Certain embodiments provide for Natural Language Processing (NLP), such that knowledge management system 102 can be considered as an NLP system, which in certain implementations performs the methods described herein. In one embodiment, the process sends queries in the form of natural language questions, etc.) to the knowledge manager computing device 104. Knowledge manager computing device 104 may interpret questions/queries and provide a response to the content user containing one or more answers/results to the questions/queries. In some embodiments, knowledge manager computing device 104 may provide a response to users in a ranked list of answers. Certain embodiments provide for knowledge manager computing device 104 to include a search/discovery engine 114.

One such knowledge management system 102 is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

In some illustrative embodiments, knowledge manager computing device 104 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds, or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like.

Types of information handling systems that can utilize computer network environment 100 range from small handheld devices, such as handheld computer/mobile telephone 116 to large mainframe systems, such as mainframe computer 118. Examples of handheld computer 116 include personal digital assistants (PDAs), personal entertainment devices, such as MP3 players, portable televisions, and compact disc players. Other examples of information handling systems include pen, or tablet, computer 120, laptop, or notebook, computer 122, personal computer system 124, and server 126. In certain embodiments, the location information is determined through the use of a Geographical Positioning System (GPS) satellite 130. In these embodiments, a handheld computer or mobile telephone 116, or other device, uses signals transmitted by the GPS satellite 130 to generate location information, which in turn is provided via the network 106 to the knowledge manager system 102 for processing. As shown, the various information handling systems can be networked together using network 106. Types of network 106 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 126 utilizes nonvolatile data store 132, and mainframe computer 118 utilizes nonvolatile data store 134. The nonvolatile data store 134 can be a component that is external to the various information handling systems or can be internal to one of the information handling systems. Furthermore, a data source 136 is provided in computer network environment 100.

Figure 2:
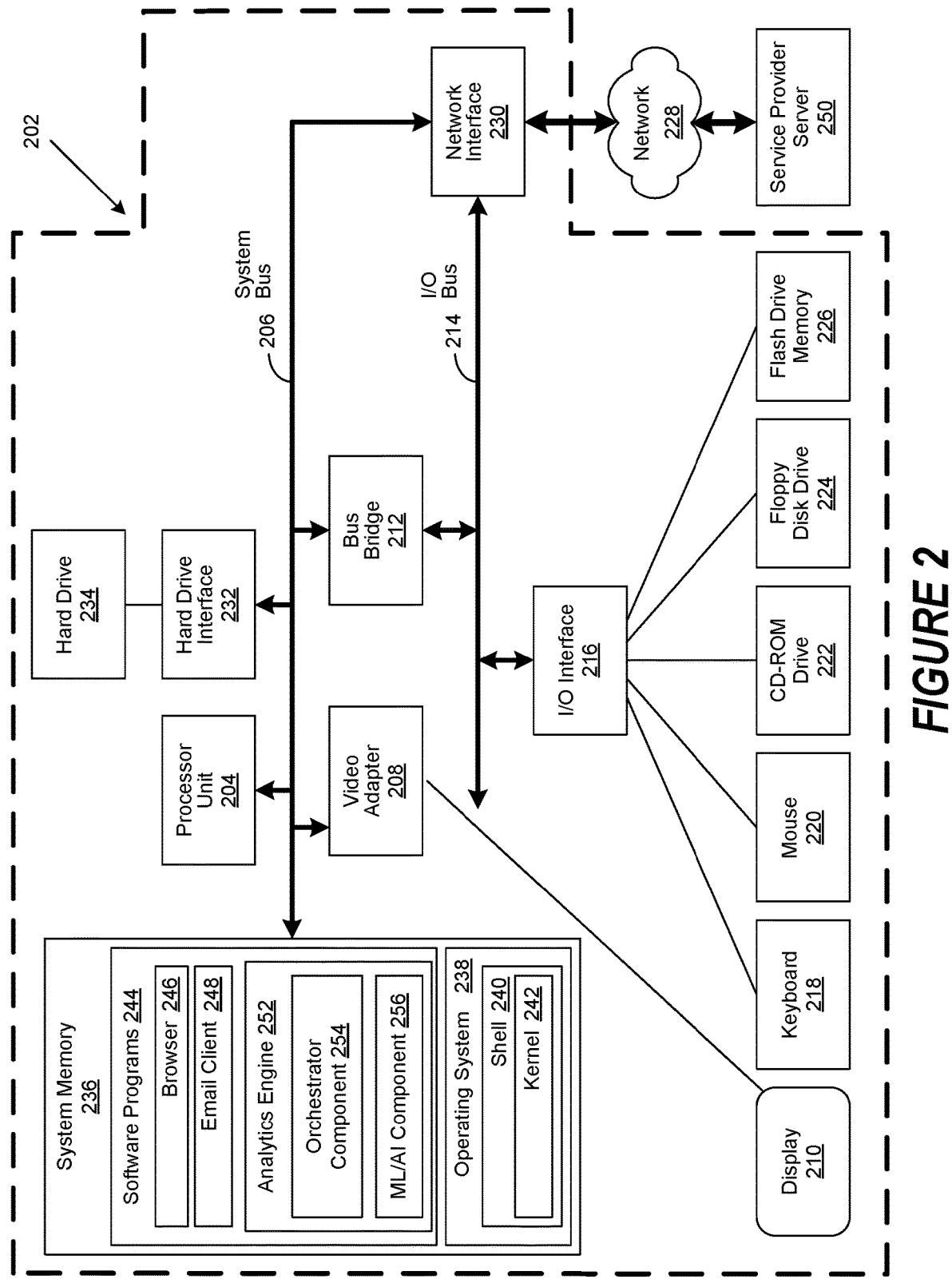
FIG. 2 is a simplified block diagram of an information handling system capable of performing computing operations described herein.

An illustrative example of an information handling system showing an exemplary processor and various components commonly accessed by the processor is shown in FIG. 2. FIG. 2 illustrates an information processing handling system 202, more particularly, a processor and common components, which is a simplified example of a computer system capable of performing the computing operations described herein. Information processing handling system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing information handling system 202 is able to communicate with a service provider server 250 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 250. In certain implementations, network 228 is the same as network 106 described in FIG. 1.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing information handling system 202) to send and receive network messages to the Internet using Hyper Text Transfer Protocol (HTTP) messaging, thus enabling communication with service provider server 250.

In various embodiments, software programs 244 includes an analytics engine 252. The analytics engine 252 can include an orchestrator component 254. In general, the analytics engine 252 and orchestrator component 254 are configured to provide data analysis and providing a platform to run workflows to analyze data. Furthermore, in certain implementations, the analytics engine 252 includes a machine learning (ML), artificial intelligence (AI) or ML/AI component 256. As described herein, the ML/AI component 256 can be configured to perform analytics on downloaded data converted to tasks as part of a workflow.

The hardware elements depicted in the information processing information handling system 202 are not intended to be exhaustive, but rather are representative to highlight components used by the present invention. For instance, the information processing information handling system 202 may include alternate memory storage devices such as magnetic cassettes, Digital Versatile Disks (DVDs), Universal Serial Bus (USB) drives, Secure Digital (SD) cards, Solid State Drive (SSD), and the like. These and other variations are intended to be within the spirit, scope and intent of the present invention. Furthermore, it is to be understood that in certain implementations, the described aspects of information processing information handling system 202 can be performed through decentralized cloud computing.

Figure 3:
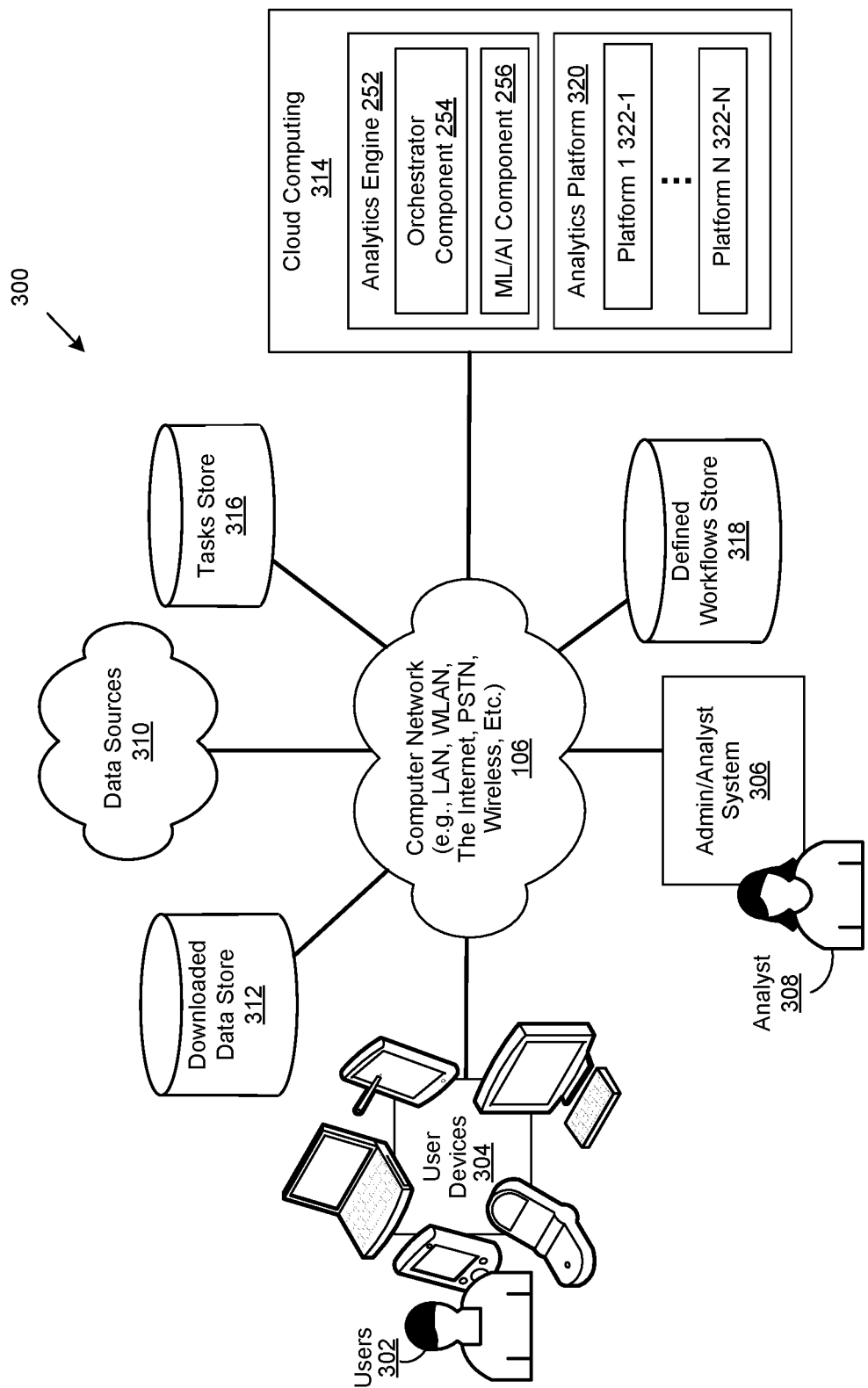
FIG. 3 is a simplified block diagram of the system capable of implementing the described operations and methods.

FIG. 3 shows a system capable of implementing the described operations and methods. The system 300 includes the network 106 described above, which connects multiple users 302 through user devices 304 to various systems, sources, databases, computing platforms, etc. as further described herein. A user device 304 can refer to an information handling system such as a personal computer, a laptop computer, a tablet computer, a personal digital assistant (PDA), a smart phone, a mobile telephone, or other device that is capable of communicating and processing data. The user devices 304 are part of a secure information technology (IT) infrastructure of an entity, such as a private business or company, government institution, university, research institution, military facility, etc.

The secure IT infrastructure can further include administrative or analyst systems represented by admin/analyst system 306, which are accessed and controlled by analysts represented by analyst 308. Admin/analyst system 306 can be implemented as information handling systems and connected to the network 106.

In certain instances, users 302 through user devices 304 access data from data sources 310 which are external to the secure IT infrastructure. For example, users 302 may perform a search query that directs the users 302 to download data from one or more of data sources 310. The data sources 310 can include various websites, external data stores, cloud computing platforms, etc. which are connected through network 106.

In various implementations, the accessed data from data sources 310 are stored downloaded data store 312. Downloaded data store 312 can be part of the secure IT infrastructure. In certain implementations, data that is downloaded from data sources 310 is formatted in a particular data structure, such as Structured Threat Information Expression (STIX™), which is a language and serialization format used to exchange cyber threat intelligence (CTI).

In various embodiments, the system 300 includes system 202 implemented as decentralized cloud computing 314 which includes the analytics engine 252, orchestrator component 254, and ML/AI component 254. Analyst 308 through admin/analyst system 306 accesses cloud computing 314. Various implementations provide for analyst 308 to request the cloud computing 314 to perform data analysis, providing a platform to run workflows to analyze data.

In certain implementations, the analytics engine 252 accesses the data of downloaded data store 312 and converts the data to a format readable by the ML/AI component 256, such as columnar data, that can include comma-separated values (CSV) files. This provides for automatic conversion of normalized, standards-based data (e.g., STIX™ data) to ML datasets. For example, the data in downloaded data store 312 can be STIX™ data in JSON format. This data can be processed depth-first, with each object attribute that is discovered converted to a column. Configuration can be specified to explicitly define and create columns. The resulting CSV file can contain all observable data, possibly in a sparse form. CSV provides for a portable analytics data format and can be understood by ML/AI component 256. The ML/AI component 256 can be configured to create jobs or tasks associated with the downloaded data.

Jobs or tasks, such as analytic tasks or extract, transform, load (ETL) tasks can be created by the ML/AI component 256 for the downloaded converted data. An ETL task can be a code encapsulated in a container that moves or transforms data, such as STIX™ data. Such jobs or tasks can be stored in tasks store 316. Jobs or tasks, implemented as code, such as code in containers operated on the converted data. Such jobs or tasks are "reusable" or can be accessed for other data analysis such as security threat/incident analysis. In certain implementations, an application program interface (API) is provided at admin/analyst system 306 to allow analyst 308 to interact with columnar data (transformed data) to perform interactive and exploratory analytics.

The system 300 further can include a defined workflows store 318, which includes various workflows, which can be predefined or determined. In certain implementations, analyst 308 defines or chooses a predefined workflow to run a data analysis. The orchestrator component 254 accesses the jobs or tasks from tasks store 316 and runs the tasks with the workflow identified by the analyst 308. For example, one or more ETL tasks are followed by one or more analytic tasks followed by more ETL tasks. Each of the individual ETL and/or analytic tasks can be standalone docker containers (Kubernetes) or a Spark job. Such sequence of tasks are defined as workflows.

In certain implementations, jobs or tasks that are processed by a workflow are ran on particular platforms. For example, an analytics task may run on an Apache Spark distributed processing system, while ETL tasks may run on a Kubernetes open-source container-orchestration system. Certain implementations provide for jobs or tasks to be identified by job type. In other words, jobs or tasks are registered, such as through a configuration file for the job or task. A workflow can either be created or defined from defined workflows store 318, and registered.

Cloud computing 314 provides a framework and an analytics platform 320 that includes specific platforms 322-1 to 322-N. Platforms 322-1 to 322-N provide particular platforms for platform specific jobs or tasks to run on. For example, platforms 322-1 to 322-N may include a Kubernetes platform, a Spark platform, etc. The workflow that runs the sequence of jobs or tasks is considered as heterogenous, because different jobs or tasks running on different platforms can be supported. In specific implementations, the orchestrator component 256 manages and schedules (in parallel or in sequence) per the defined workflow, as to dependency. Therefore, different types of jobs or tasks can be mixed and matched per a single workflow.

Figure 4:
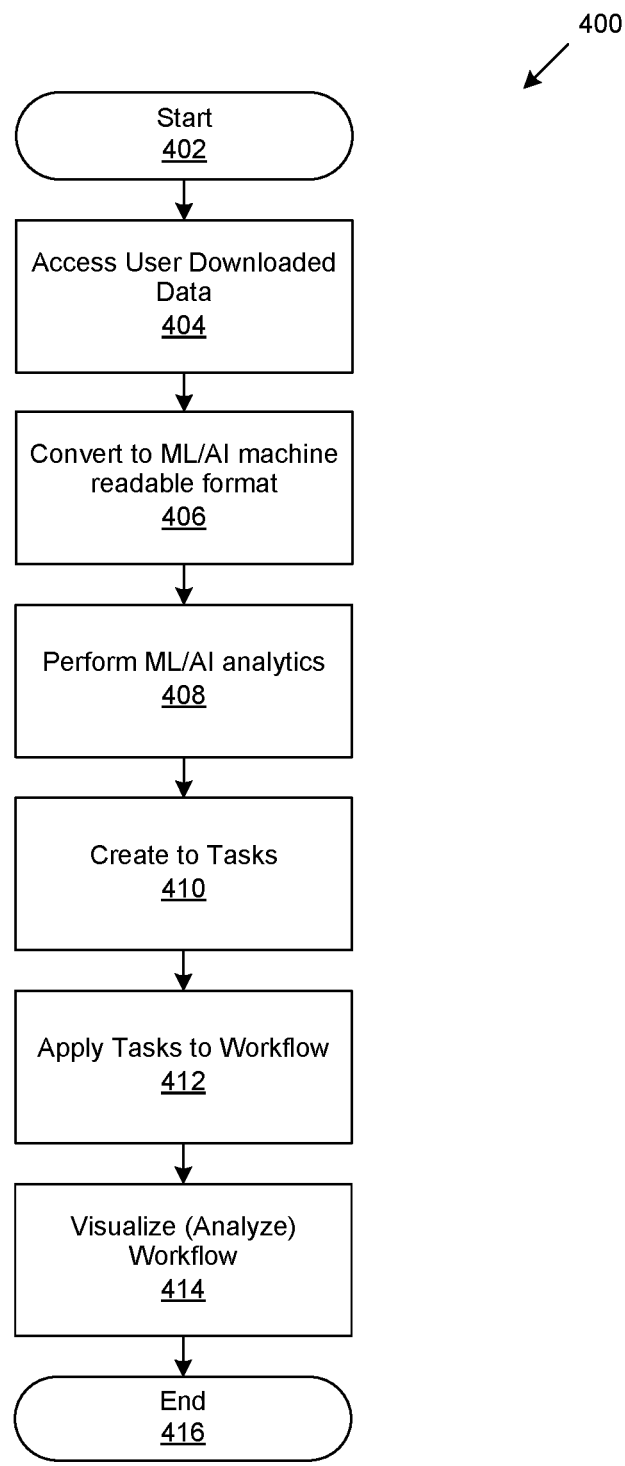
FIG. 4 is a generalized flowchart for running and synchronization of heterogeneous data exploration related analytic jobs in a workflow.

FIG. 4 is a generalized flowchart 400 for running and synchronization of heterogenous data exploration related analytic jobs in a workflow. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. For example, the system 300 as described above, can be implemented to support process 400.

At step 402, the process 400 starts. At step 404, user downloaded data is accessed. In certain implementations, as described above, users 302 access data from data sources 310 external to an entity's IT infrastructure. The downloaded data may be in a particular format, such as STIX™ data in JSON format and stored in downloaded data store 312 which can be included in the entity's IT infrastructure. Cloud computing 314 may be instructed to access the downloaded data.

A step 404, the downloaded data is converted to ML/AI machine readable format. As described above, for example, STIX™ data in JSON format is converted into columnar data, such as CSV files. The conversion can provide for normalized, standards-based data (e.g., STIX™ data) to ML dataset.

At step 408, ML/AI analytics are performed on the converted data. Such analytics can be performed by the ML/AI component 256 and provide insights as to the converted data, and create jobs or tasks associated with the converted data. At step 410, jobs or tasks are created for the converted data. As described, the job or tasks can be stored in tasks store 316. Such jobs or tasks can be analytics tasks or ETL tasks. Furthermore, such jobs or tasks are "reusable" or can be accessed for other data analysis such as security threat/incident analysis.

At step 412, a sequence is determined as to workflow for specific jobs or tasks. As described, the workflow can be predefined or determined by an analyst 308, and is directed to a particular data analysis, such as a security threat or incident. Jobs or tasks may be platform specific. The heterogenous workflow provides for jobs or tasks to be run in parallel or in sequence on particular platforms.

At step 414, the workflow is visualized or ran to provide the data analysis regarding operation of jobs or tasks in the particular workflow. At step 416, the process 400 ends.

Figure 5:
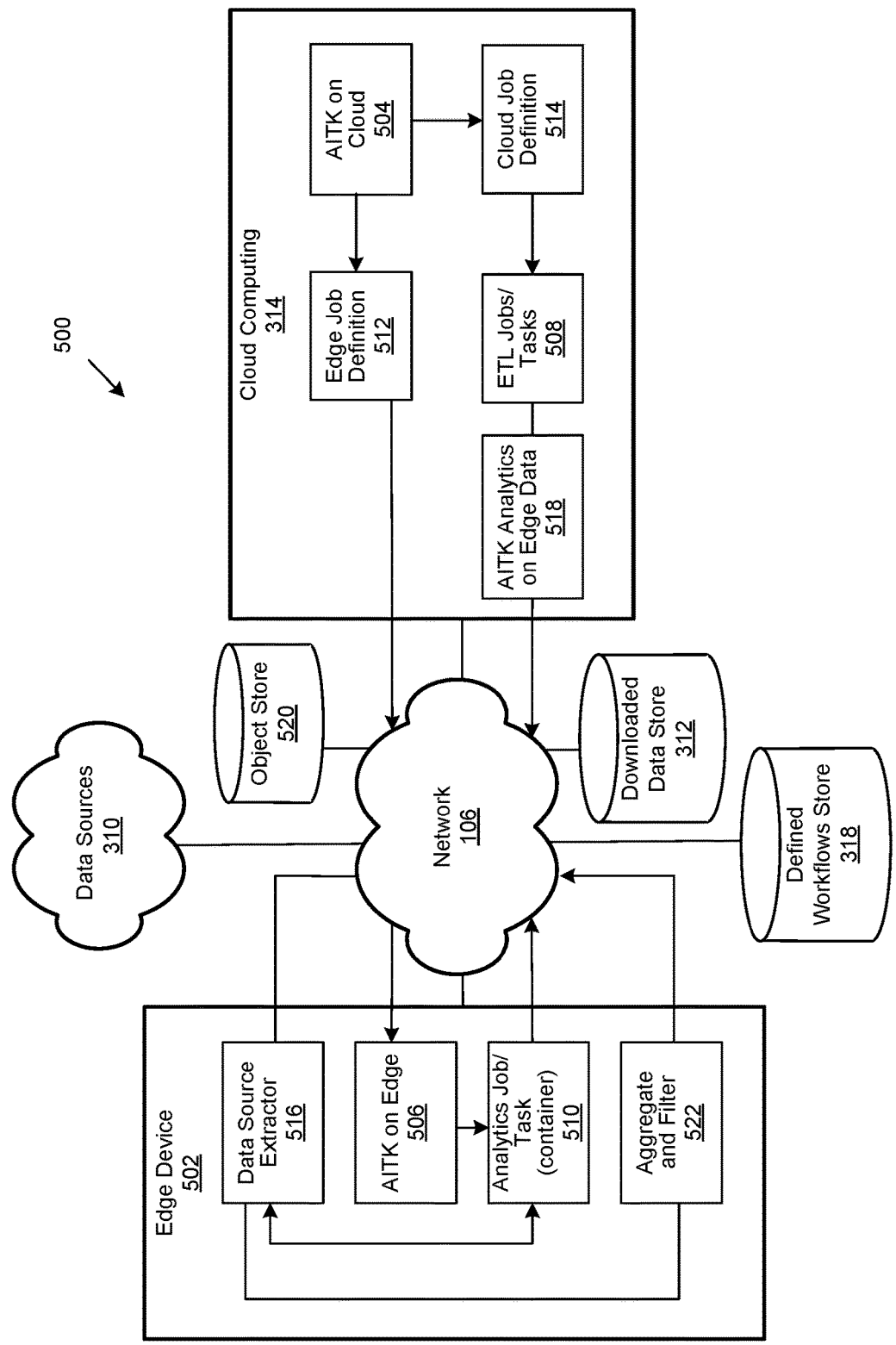
FIG. 5 is a simplified block diagram of the system that shares processing of jobs or tasks on cloud computing and edge device computing.

FIG. 5 shows a system that shares processing of jobs or tasks on cloud computing and edge device computing. In certain implementations, analytic jobs are shared cloud computing 314 and an edge device 502. In certain instances, there is a desire to process certain jobs or tasks in a workflow at the cloud computing 314 and process other jobs or tasks in the workflow at the edge device 502. For example, processing at the edge device 502 may be more efficient than processing at cloud computing 314.

In certain implementations, an artificial intelligence tool kit or AITK on cloud 504 is implemented on cloud computing 314. The AITK on cloud 504 is paired with a similar AITK on edge 502 implemented on edge device 502. Edge device 502 can be system near a data capture system, such as user devices 304. AITK on cloud 504 and AITK on edge 506 coordinate to process jobs, performing functions of orchestrator component 254 described above.

In this example, cloud computing 314 performs data analysis of ETL jobs/tasks 508 and the edge device 502 performs data analysis of an analytics job/task (e.g. container based) 510. In certain implementations, the AITK on cloud 504 provides edge job definition 512 which is sent to and received by AITK on edge 506. The AITK on cloud 504 further provides cloud job definition 514.

In certain implementations, the edge device 502 includes a data source extractor 516 that accesses data sources 310 and downloaded data 312. Data source extractor 516 is further configured to provide and receive analytics job/task 510.

Cloud job definition 514 processes the ETL jobs/tasks 510 and analytics job/task 510 is processed from edge job definition 512 as received by AITK on edge 506. ETL jobs/tasks 508 is combined with AITK analytics jobs/tasks represented by AITK analytics on edge data 518, as processed on edge device 502. ETL jobs/tasks 508 and AITK analytics on edge data 518 can be stored in object store 520. Data sources extractor 516 receives analytics job/task 510 and passes analytics job/task 510 for aggregation and filtering as represented by aggregate and filter 522. In certain implementations, the aggregated and filtered analytics job/task 510 is sent to object store 520. Other implementations provide for aggregated and filtered analytics job/task 510 to be sent to a different object store.

Figure 6:
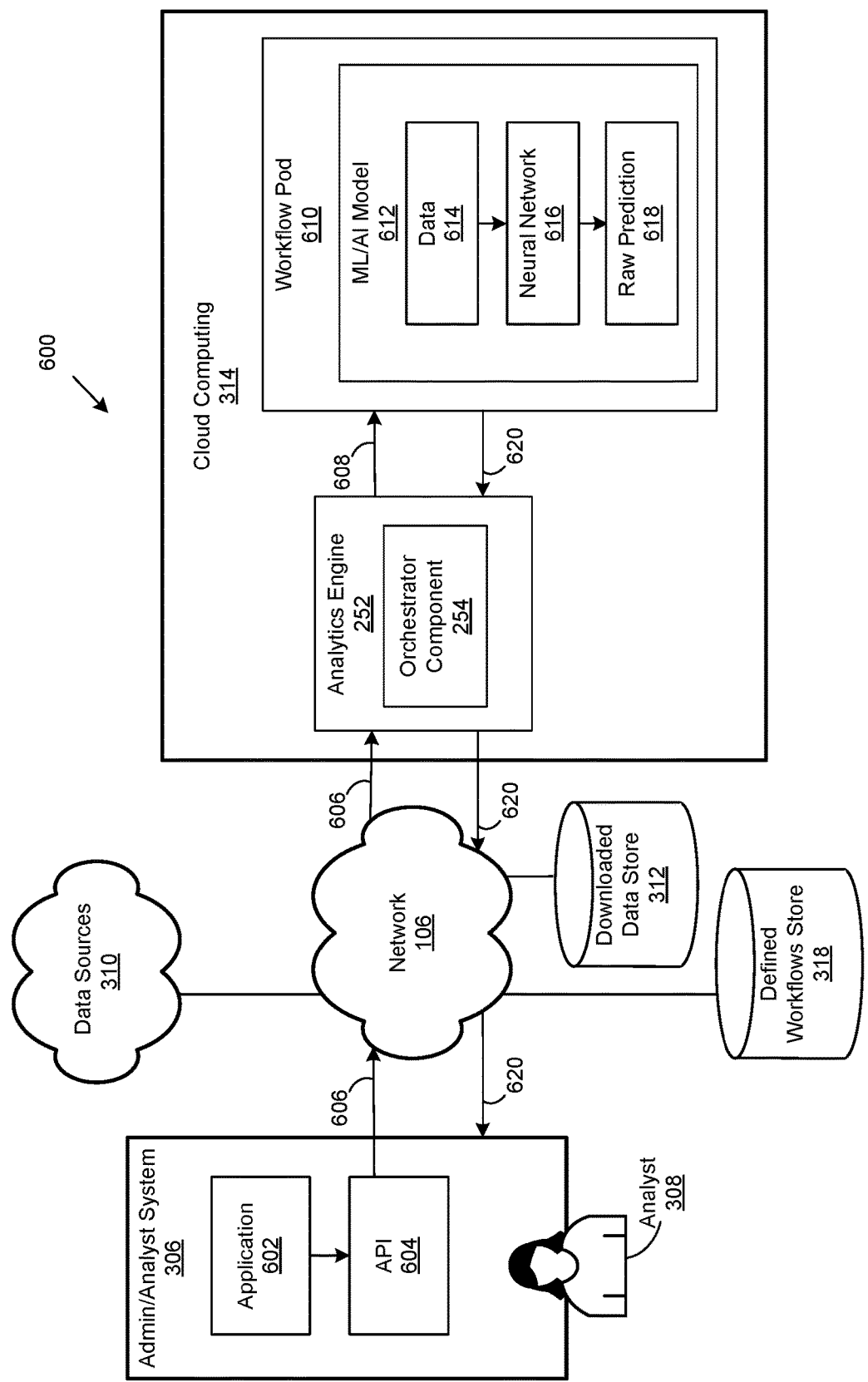
FIG. 6 is a simplified block diagram of the system that supports workflow or data frame as a service.

FIG. 6 shows a that supports workflow or data frame as a service. In certain instances, a workflow can define a job and is ran as batch operation to completion. In other instances, it may be desirable to have a job ran as a service that is dynamically created.

The system 600 provides for the admin/analyst system 306 to include an application 602 that allows the analyst 308 to request service from cloud computing 314. In particular, an API 604 provides for data through an API call 606 to be sent to cloud computing 314 and specifically to the analytics engine 252. The analytics engine 252 forwards data and a request 608 to a workflow pod 610. The workflow pod 610 includes a ML/AI model 612 wrapped in or accessible through an API. The workflow or data frame as a service is provided through the ML/AI model 612.

In certain implementations, the ML/AI model 612 receives the data 614. The received data 614 is processed through a neural network 616. The neural network 616 provides a raw prediction 618. The prediction is forwarded 620 to the admin/analyst system 306.

In certain implementations, analytic workflows expose a transmission control protocol (TCP) port, with authentication and authorization provided by a hosting SaaS based service or cloud computing 314. Upon startup, a service-enabled workflow dynamically establishes an API endpoint, enabling interactive analytics, AWL model 612 deployment, etc. The analytics engine 252 and orchestrator component forwards the request 608 to the exposed workflow pod 610 as a service. A data frame can be a table or a two-dimensional array-like structure in which each column contains values of one variable and each row contains one set of values from each column. The system supports data frame analytics (e.g., statistical computations) on portions of a data frame, such as data frame in memory of admin/analyst system 306 and can provide seamless data analysis.

Figure 7:
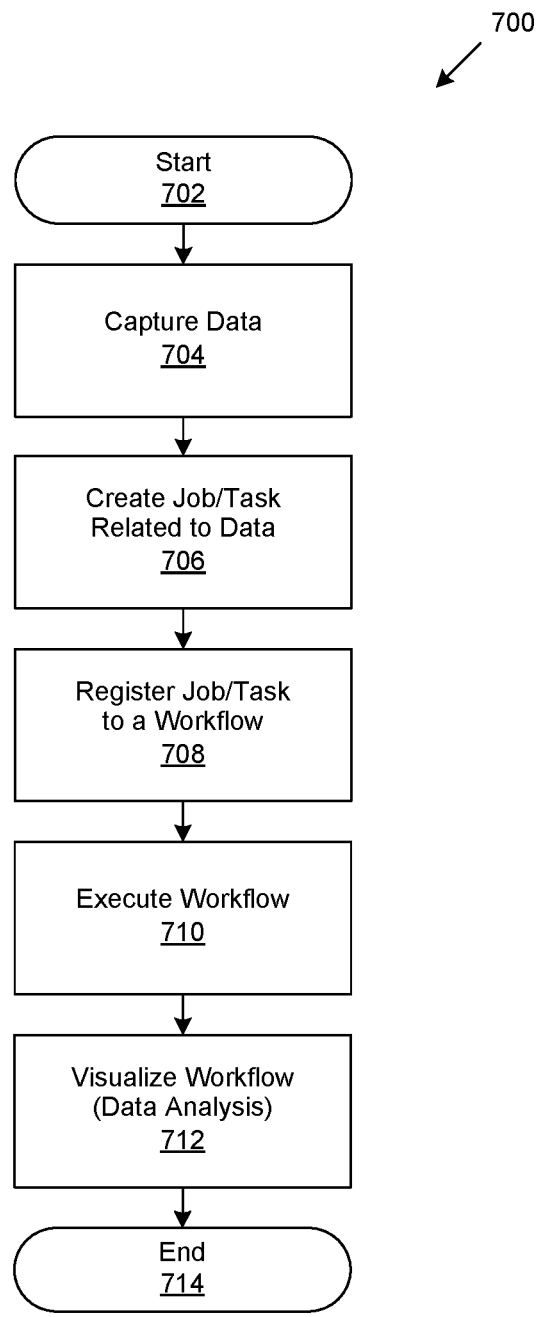
FIG. 7 is a generalized flow chart for analyzing data, such as captured data to determine security incidents.

FIG. 7 is a generalized flowchart 700 for analyzing data, such as captured data to determine security incidents. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 702, the process 700 starts. At step 704, a data that is downloaded from one or more users is captured. In certain implementations, the data is security related data in STIX™ format. The data may be related to a security incident, and analyzing such data is performed to determine a security incident such as a security threat.

At step 706, individual jobs or tasks that operate on the data are created. In certain implementations, as described, ML/AI component 256 creates such jobs or tasks. A job or task can be an analytic job/task or an ETL job or task. Sch jobs or tasks can be reused for other data analysis.

At step 708, each individual job/task is registered to a workflow. The workflow may be predefined or determined by an analyst, such as workflows in defined workflows 318. At step 710, the work flow is executed. Executing the workflow can include transporting data from an originating location, such as downloaded data store 312 to a machine learning location, such as ML/AI component 256, ML/AI model 612. Furthermore, executing the workflow can include performing machine learning analytics on the data. At step 712, work flow is visualized to perform data analysis. At step 714, the process 700 ends.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
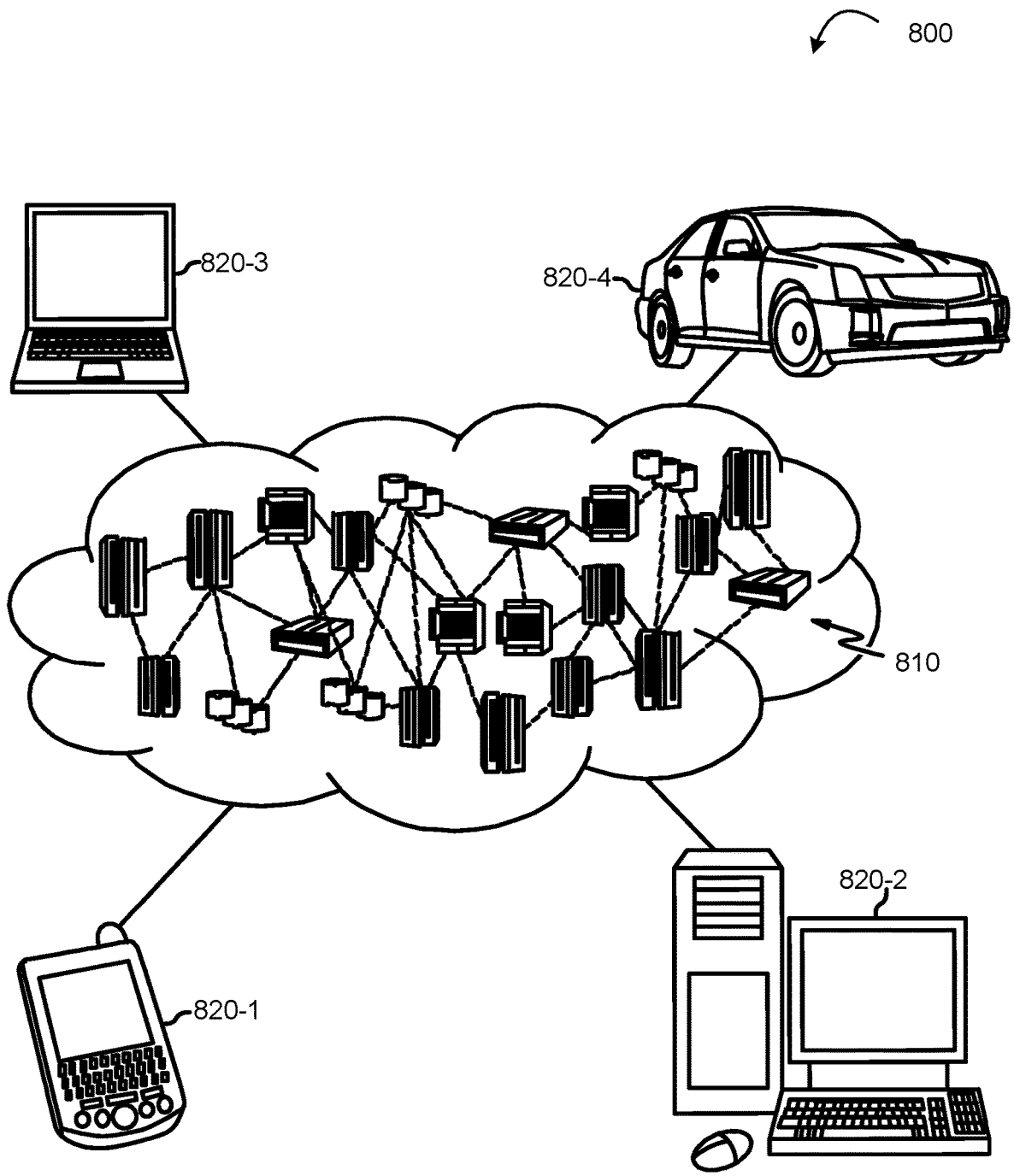
FIG. 8 depicts a cloud computing environment according to an embodiment of the present invention.

Referring now to FIG. 8, illustrative cloud computing environment 800 is depicted. As shown, cloud computing environment 800 includes one or more cloud computing nodes 810 with which local computing devices used by cloud consumers, such as, for example, personal digital assistant (PDA) or cellular telephone 820-1, desktop computer 820-3, laptop computer 820-3, and/or automobile computer system 820-4 may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 820-1, 820-2, 820-3, and 820-4 shown in FIG. 1 are intended to be illustrative only and that computing nodes 810 and cloud computing environment 800 can communicate with any type of computerized device over any type of network and/or network addressable connection (e.g., using a web browser).

Figure 9:
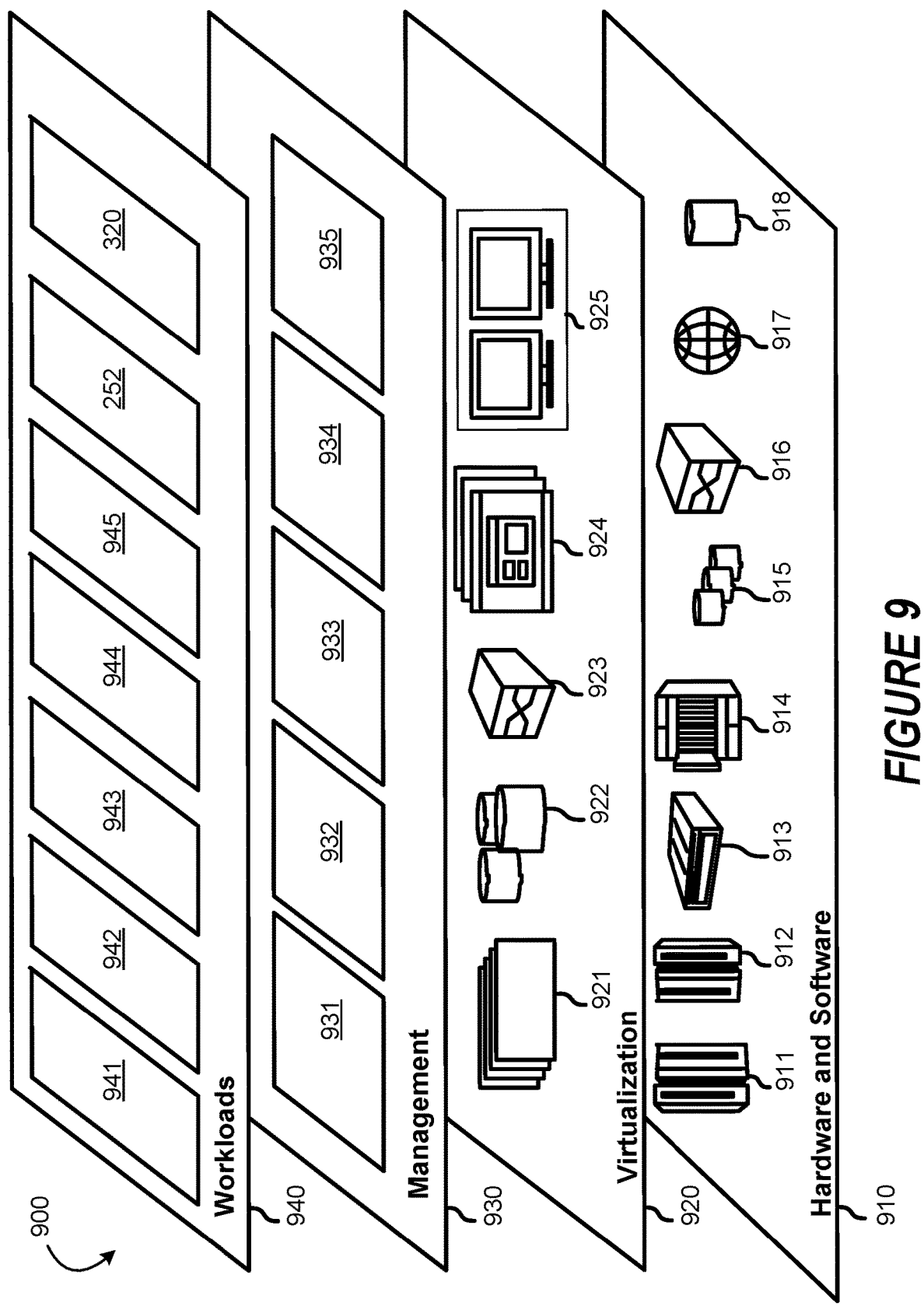
FIG. 9 depicts abstraction model layers according to an embodiment of the present invention.

Referring now to FIG. 9, a set of functional abstraction layers provided by cloud computing environment 800 (FIG. 9) is shown. It should be understood in advance that the components, layers, and functions 900 shown in FIG. 9 are intended to be illustrative only and embodiments of the invention are not limited thereto. As depicted, the following layers and corresponding functions are provided:

Hardware and software layer 910 includes hardware and software components. Examples of hardware components include: mainframes 911; RISC (Reduced Instruction Set Computer) architecture based servers 912; servers 913; blade servers 914; storage devices 915; and networks and networking components 916. In some embodiments, software components include network application server software 917 and database software 918.

Virtualization layer 920 provides an abstraction layer from which the following examples of virtual entities may be provided: virtual servers 921; virtual storage 922; virtual networks 923, including virtual private networks; virtual applications and operating systems 924; and virtual clients 925.

In one example, management layer 930 may provide the functions described below. Resource provisioning 931 provides dynamic procurement of computing resources and other resources that are utilized to perform tasks within the cloud computing environment. Metering and Pricing 932 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 933 provides access to the cloud computing environment for consumers and system administrators. Service level management 934 provides cloud computing resource allocation and management such that required service levels are met. Service Level Agreement (SLA) planning and fulfillment 935 provide pre-arrangement for, and procurement of, cloud computing resources for which a future requirement is anticipated in accordance with an SLA.

Workloads layer 940 provides examples of functionality for which the cloud computing environment may be utilized. Examples of workloads and functions which may be provided from this layer include: mapping and navigation 941; software development and lifecycle management 942; virtual classroom education delivery 943; data analytics processing 944; transaction processing 945; and analytics engine 252 (as described herein) and analytics platform 320 (as described herein).

As will be appreciated by one skilled in the art, aspects of the present invention may be embodied as a system, method, or computer program product. Accordingly, aspects of the present invention may take the form of an entire hardware embodiment, an entire software embodiment (including firmware, resident software, micro-code, etc.) or an embodiment combining software and hardware aspects that may all generally be referred to herein as a "circuit", "module" or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation, no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A computer-implemented method for analyzing data in a security threat to determine a threat, comprising:
   capturing at an edge device implementing an artificial intelligence tool kit (AITK), security data related a security incident as to actions performed by one or more users;
   creating at the edge device, individual tasks related to each captured data, the individual task being a container configured to be an analytic task and a transfer task;
   performing data analysis on extract, transform, load (ETL) tasks by a cloud computing implementing a second AITK and sent to the edge device for processing;
   registering each individual task to a workflow for executing particular tasks, wherein the workflow is selected based on the captured security data; and
   executing the workflow, wherein the workflow includes:
      transporting the security data from an origin location to a machine learning destination;
      performing machine learning analytics on the security data to determine a threat;
      transporting, upon determining the threat, the threat to the origin location; and
      visualizing the threat.

2. The method of claim 1, wherein the captured data relates to a security incident or threat and formatted as Structured Threat Information eXpression data.

3. The method of claim 1 further comprising providing the individual tasks to be reused.

4. The method of claim 1, wherein the tasks are specific to a platform and providing platforms for the tasks to run on when executing the workflow.

5. The method of claim 1, wherein the executing the workflow comprises performing analysis of the tasks and the analysis is shared between a cloud computing system and an edge device.

6. The method of claim 1, wherein the executing further comprises performing machine learning analytics on the captured data.

7. The method of claim 1, further comprising providing an interactive analysis for data frame as a service.

8. A system comprising:
   a processor;
   a data bus coupled to the processor; and
   a computer-usable medium embodying computer program code, the computer-usable medium being coupled to the data bus, the computer program code configured for analyzing data in a security threat to determine a threat, comprising:
   capturing at an edge device implementing an artificial intelligence tool kit (AITK), security data related a security incident as to actions performed by one or more users;
   creating at the edge device, individual tasks related to each captured data, the individual task being a container configured to be an analytic task and a transfer task;
   performing data analysis on extract, transform, load (ETL) tasks by a cloud computing implementing a second AITK and sent to the edge device for processing;
   registering each individual task to a workflow for executing particular tasks, wherein the workflow is selected based on the captured security data; and
   executing the workflow, wherein the workflow includes:
      transporting the security data from an origin location to a machine learning destination;
      performing machine learning analytics on the security data to determine a threat;
      transporting, upon determining the threat, the threat to the origin location; and
      visualizing the threat.

9. The method of claim 8, wherein the captured data relates to a security incident or threat and formatted as Structured Threat Information eXpression data.

10. The method of claim 8 further comprising providing the individual tasks to be reused.

11. The method of claim 8, wherein the tasks are specific to a platform and providing platforms for the tasks to run on when executing the workflow.

12. The method of claim 8, wherein the executing the workflow comprises performing analysis of the tasks and the analysis is shared between a cloud computing system and an edge device.

13. The method of claim 8, wherein the executing further comprises performing machine learning analytics on the captured data.

14. The method of claim 8, further comprising providing an interactive analysis for data frame as a service.

15. A non-transitory, computer-readable storage medium embodying computer program code, the computer program code comprising computer executable instructions configured for:
   capturing at an edge device implementing an artificial intelligence tool kit (AITK), security data related a security incident as to actions performed by one or more users;
   creating at the edge device, individual tasks related to each captured data, the individual task being a container configured to be an analytic task and a transfer task;

performing data analysis on extract, transform, load (ETL) tasks by a cloud computing implementing a second AITK and sent to the edge device for processing;

registering each individual task to a workflow for executing particular tasks, wherein the workflow is selected based on the captured security data; and executing the workflow, wherein the workflow includes:
- transporting the security data from an origin location to a machine learning destination;
- performing machine learning analytics on the security data to determine a threat;
- transporting, upon determining the threat, the threat to the origin location; and
- visualizing the threat.

16. The non-transitory, computer-readable storage medium of claim 15, wherein the captured data relates to a security incident or threat and formatted as Structured Threat Information eXpression data.

17. The non-transitory, computer-readable storage medium of claim 15, comprising providing the individual tasks to be reused.

18. The non-transitory, computer-readable storage medium of claim 15, wherein the tasks are specific to a platform and providing platforms for the tasks to run on when executing the workflow.

19. The non-transitory, computer-readable storage medium of claim 15, wherein the executing the workflow comprises performing analysis of the tasks and the analysis is shared between a cloud computing system and an edge device.

20. The non-transitory, computer-readable storage medium of claim 15, further comprising providing an interactive analysis for data frame as a service.

* * * * *